US011993076B2

(12) United States Patent
Nihashi

(10) Patent No.: US 11,993,076 B2
(45) Date of Patent: May 28, 2024

(54) PRINTER APPARATUS

(71) Applicant: TOSHIBA TEC KABUSHIKI KAISHA, Tokyo (JP)

(72) Inventor: Kiyotaka Nihashi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 179 days.

(21) Appl. No.: 17/583,447

(22) Filed: Jan. 25, 2022

(65) Prior Publication Data

US 2022/0305823 A1 Sep. 29, 2022

(30) Foreign Application Priority Data

Mar. 24, 2021 (JP) ................................ 2021-050055

(51) Int. Cl.
*B41J 15/16* (2006.01)
*B41J 3/407* (2006.01)
*B41J 11/70* (2006.01)

(52) U.S. Cl.
CPC ............ *B41J 15/16* (2013.01); *B41J 3/4075* (2013.01); *B41J 11/70* (2013.01)

(58) Field of Classification Search
CPC . B41J 15/16; B41J 3/4075; B41J 11/70; B41J 15/00; B41J 15/04; B41J 15/044; B41J 15/046
See application file for complete search history.

(56) References Cited

U.S. PATENT DOCUMENTS

2021/0252888 A1* 8/2021 Iwamoto .................. B41J 11/04

FOREIGN PATENT DOCUMENTS

JP 2010-005943 1/2010
JP 2016175686 * 10/2016 .............. B41J 15/04
JP 2020019159 * 2/2020 ................ B41J 1/70

* cited by examiner

*Primary Examiner* — Kristal Feggins

(74) *Attorney, Agent, or Firm* — Amin, Turocy & Watson, LLP

(57) ABSTRACT

A label printer includes: a thermal head to execute printing on a label sheet that includes a front print surface and a back adhesive layer and that does not include a liner; a platen roller that is provided at a position facing the thermal head, that pulls out, by being rotationally driven, one end of a roll sheet obtained by winding the label sheet in a roll shape, and that conveys the roll sheet to the thermal head; and a reciprocating control unit (configured to, when a print start instruction is received, cause a holding position of the label sheet sandwiched between the thermal head and the platen roller to reciprocate between a first position downstream in a conveyance direction of the print sheet and a second position upstream of the first position.

20 Claims, 6 Drawing Sheets

PRINTER APPARATUS

CROSS-REFERENCE TO RELATED APPLICATION

This application is based upon and claims the benefit of priority from Japanese Patent Application No. 2021-050055, filed on Mar. 24, 2021, the entire contents of which are incorporated herein by reference.

FIELD

Embodiments described herein relate to a printer apparatus, a label printer, and a method of printing a print sheet.

BACKGROUND

In a case of a print sheet (linerless label sheet) that includes a front surface as a print surface and a back surface as an adhesive layer and does not include a liner, a print sheet on which printing is completed is kept on standby in a state in which the print sheet is sandwiched between a printing head and a platen roller. If the print sheet is kept on standby in such a state, the adhesive layer on the back surface side of the print sheet may be attached to a surface of the platen roller, and when the next printing is executed, the print sheet may remain wound around the platen roller. If such attachment of the print sheet occurs, a sheet jam may occur, and thus improvement is desired.

For example, a configuration for solving such a problem is disclosed. In this configuration, a drive roller and a driven roller facing the drive roller are provided upstream of a platen roller, and the drive roller is rotated before the start of printing, whereby a label sheet is pulled upstream and a print sheet attached to a platen roller is peeled off.

However, the above printer has a problem that a structure becomes complicated since the drive roller is necessary to be provided.

DETAILED DESCRIPTION

In general, according to one embodiment, a printer apparatus that has a simple configuration and is capable of pulling apart a print sheet attached to a platen roller is provided.

The printer apparatus according to the embodiment includes a print unit, a conveyance unit, and a reciprocating unit. The print unit executes printing on a print sheet. The print sheet includes a front surface as a print surface and a back surface as an adhesive layer, and does not include a liner. The conveyance unit is provided at a position facing the print unit, pulls out, by being rotationally driven, one end of a roll sheet obtained by winding the print sheet in a roll shape, and conveys the roll sheet to the print unit. When a print start instruction is received, the reciprocating unit causes a holding position of the print sheet sandwiched between the print unit and the conveyance unit to reciprocate between a first position downstream in a conveyance direction of the print sheet and a second position upstream of the first position in the conveyance direction.

A label printer according to an embodiment is described below with reference to the drawings.

Overall Configuration of Label Printer

Figure 1:
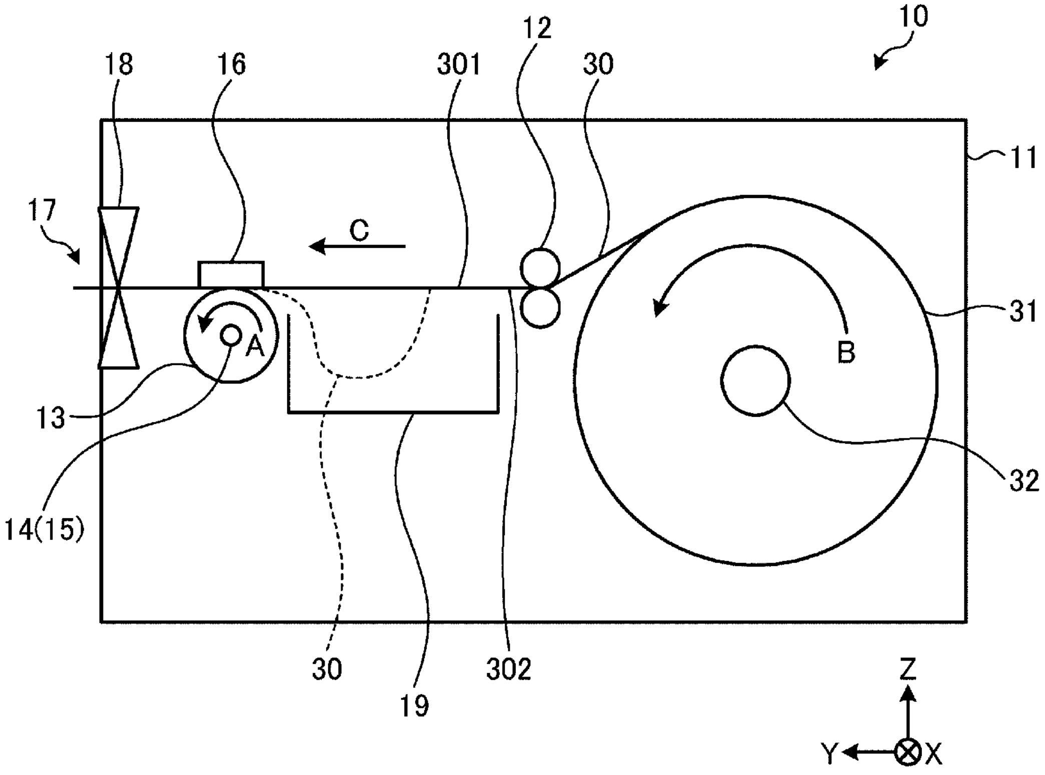
FIG. 1 is a cross-sectional view illustrating an example of an internal structure of a label printer according to an embodiment.

A schematic configuration of a label printer 10 according to the present embodiment will be described with reference to FIG. 1. FIG. 1 is a cross-sectional view illustrating an example of an internal structure of the label printer according to the embodiment. The label printer 10 is an example of a printer apparatus according to the disclosure.

The label printer 10 executes printing while pulling out a label sheet 30 from a roll sheet 31 obtained by winding the label sheet 30 around a roll core 32 in a roll shape. The label sheet 30 is an example of the print sheet. A front surface 301 of the label sheet 30 is a print surface, and a back surface 302 is an adhesive layer. That is, the label sheet 30 is a linerless label sheet that does not include a liner. The label sheet 30 is an example of a print sheet according to the disclosure.

The label printer 10 includes, inside a housing, a conveyance roller 12, a platen roller 13, a thermal head 16, a cutter 18, and a sheet retraction unit 19.

The conveyance roller 12 is a free roller that forms a conveyance path. The conveyance path guides the label sheet 30 pulled out from the roll sheet 31 toward the thermal head 16 in a direction of an arrow C.

The platen roller 13 is an example of a conveyance unit according to the disclosure, and is rotated about a shaft center 14 in a direction of an arrow A by transmitting a driving force of a platen roller drive motor 15, so that the label sheet 30 is pulled out in a direction of an arrow B from one end of the roll sheet 31. The pulled out label sheet 30 is conveyed toward the thermal head 16. The platen roller 13 is rotated about the shaft center 14 in a direction opposite to the direction of the arrow A to convey the label sheet 30 in a direction opposite to the direction of the arrow C. The reverse conveyance will be described later.

The thermal head 16 is an example of a print unit according to the disclosure, and is in close contact with the platen roller 13. The label sheet 30 is conveyed toward a discharge port 17 in a state of being sandwiched between the thermal head 16 and the platen roller 13. The thermal head 16 has a structure in which a plurality of heating elements are aligned, and executes, by causing a heating element corresponding to a print pattern to generate heat, the printing on a front surface 301 of the label sheet 30 sandwiched between the thermal head 16 and the platen roller 13.

The cutter 18 cuts the label sheet 30 discharged from the discharge port 17 after the printing is completed.

The sheet retraction unit 19 is a region that temporarily storing the label sheet 30 loosened in a region between the conveyance roller 12 and the platen roller 13 when the label sheet 30 on which printing is completed is back fed, that is, retracted upstream of the conveyance path.

Main Configuration of Label Printer

Figure 2:
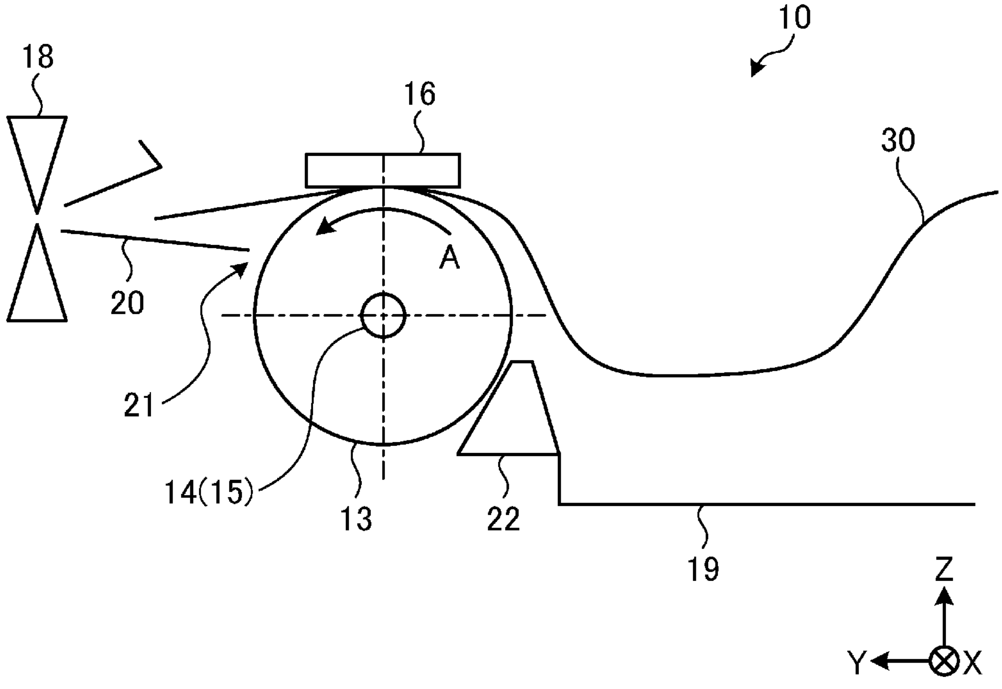
FIG. 2 is a detailed cross-sectional view of the peripheral of a platen roller.

A detailed structure of the peripheral of the platen roller 13 of the label printer 10 will be described with reference to FIG. 2. FIG. 2 is a detailed cross-sectional view of the peripheral of a platen roller.

A paper guide 20 is provided downstream (Y-axis positive side) of the platen roller 13. The paper guide 20 guides the label sheet 30 from the platen roller 13 to the cutter 18. A gap 21 is formed between the paper guide 20 and the platen roller 13 such that the rotation of the platen roller 13 is not disturbed.

On the other hand, a platen guide 22 is provided upstream (Y-axis negative side) of the platen roller 13. The platen guide 22 guides the back fed label sheet 30 to the sheet retraction unit 19.

Hardware Configuration of Label Printer

Figure 3:
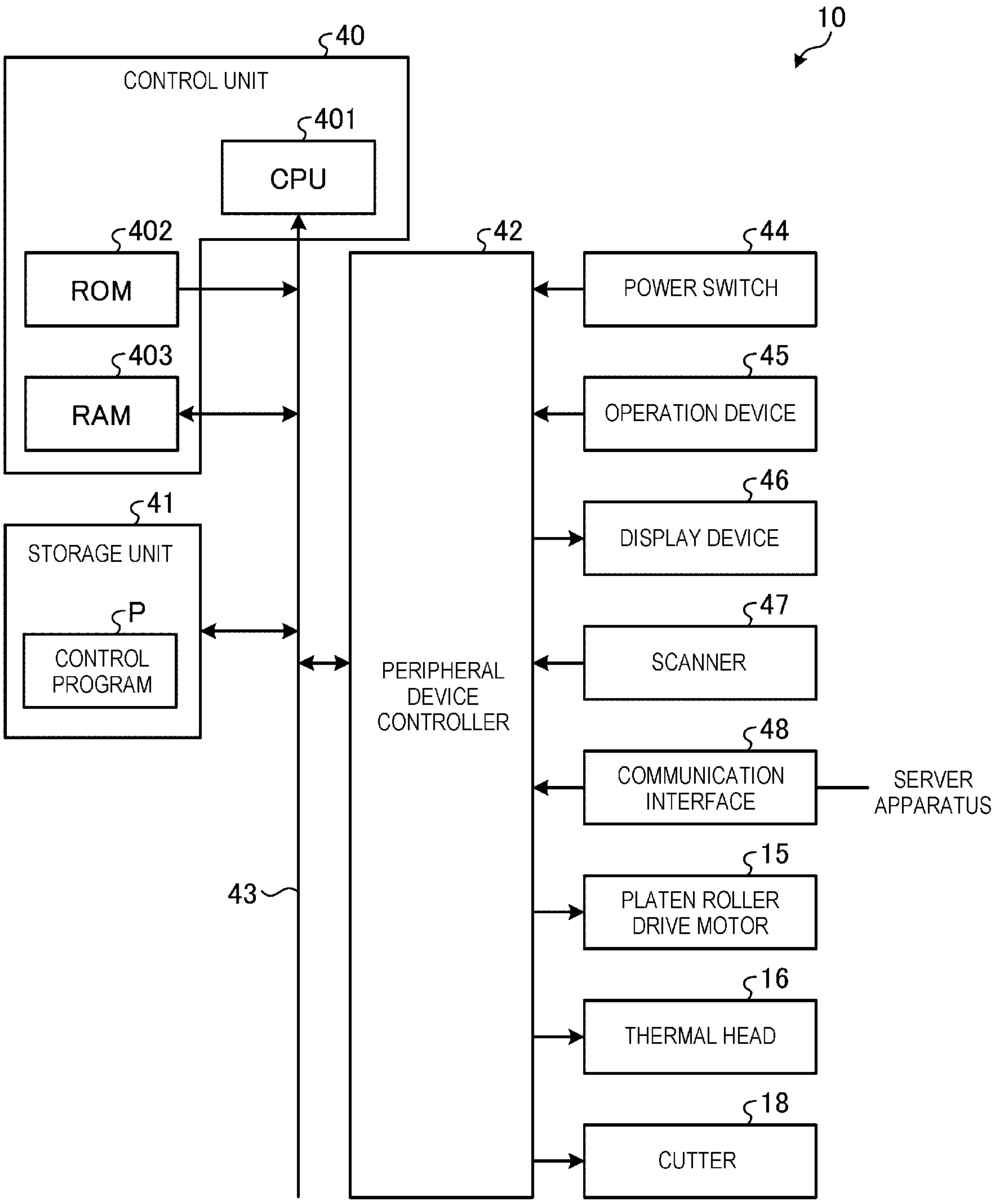
FIG. 3 is a hardware block diagram illustrating an example of a hardware configuration.

A hardware configuration of the label printer 10 will be described with reference to FIG. 3. FIG. 3 is a hardware block diagram illustrating an example of the hardware configuration of the label printer according to the embodiment.

As illustrated in FIG. 3, the label printer 10 includes a central processing unit (CPU) 401, a read only memory (ROM) 402, a random access memory (RAM) 403, a storage unit 41, and the like. The CPU 401 is a main part for control. The ROM 402 stores various types of fixed data, various tables, a printer driver, and the like. The RAM 403 functions as a work memory by loading a control program and a printer driver when the CPU 401 executes various processes. The storage unit 41 stores a control program P to be executed by the CPU 401. The CPU 401, the ROM 402, the RAM 403, and the storage unit 41 are connected to one another via an internal bus 43. The CPU 401, the ROM 402, and the RAM 403 constitute a control unit 40. That is, the control unit 40 executes various control processes by the CPU 401 loading the control program P stored in the storage unit 41 and various types of data stored in the ROM 402 in the RAM 403 and operating the control program P and the data.

The storage unit 41 is a non-volatile memory such as a hard disc drive (HDD) or a flash memory in which stored information is retained even if a power is turned off, and stores the control program P to be executed by the control unit 40. The storage unit 41 stores, for example, a template of print data not illustrated in FIG. 3.

The control program P is a program for controlling all operations of the label printer 10.

The control unit 40 is connected to a power switch 44, an operation device 45, a display device 46, a scanner 47, a communication interface 48, the platen roller drive motor 15, the thermal head 16, and the cutter 18, which are peripheral devices, via the internal bus 43 and a peripheral device controller 42. Upon receiving an instruction from the control unit 40, the peripheral device controller 42 controls operations of these peripheral devices.

The power switch 44 is a switch that turns on and off a main power of the label printer 10.

The operation device 45 is an operation device that executes various operation instructions to the label printer 10. The operation device 45 is, for example, a touch panel or a mechanical switch.

The display device 46 displays an operation state, print data, and the like of the label printer 10. The display device 46 is, for example, a liquid crystal panel.

The scanner 47 causes the label printer 10 to generate the print data by reading information such as a commodity code registered in a bar code or the like. The scanner 47 is, for example, a bar code reader.

The communication interface 48 communicably connects the label printer 10 and a server apparatus (not illustrated) or the like. The label printer 10 acquires the print data from the server apparatus or the like via the communication interface 48.

The platen roller drive motor 15 is a motor that rotates the shaft center 14 of the platen roller 13 by a predetermined angle in a predetermined direction. The platen roller drive motor 15 is, for example, a stepping motor. The platen roller drive motor 15 is rotated by only an instructed angle in a direction instructed by the control unit 40 of the label printer 10. More specifically, the platen roller drive motor 15 is rotated by only an angle corresponding to the number of acts instructed by the control unit 40. For example, if the platen roller drive motor 15 is rotated by an angle $\theta$ in one act, the platen roller drive motor 15 is rotated by an angle $n\times\theta$ if a rotation instruction for n acts is received. At this time, if a roller radius of the platen roller 13 is r, a conveyance amount k of the label sheet 30 is calculated by $k==rn\theta$.

The thermal head 16 has a structure in which the plurality of heating elements are aligned, and executes, by causing the heating element corresponding to the print pattern to generate heat, the printing on the label sheet 30 sandwiched between the thermal head 16 and the platen roller 13.

The cutter 18 is provided in the vicinity of the discharge port 17, and cuts the label sheet 30 upon receiving an instruction from the CPU 401.

Functional Configuration of Label Printer

Figure 4:
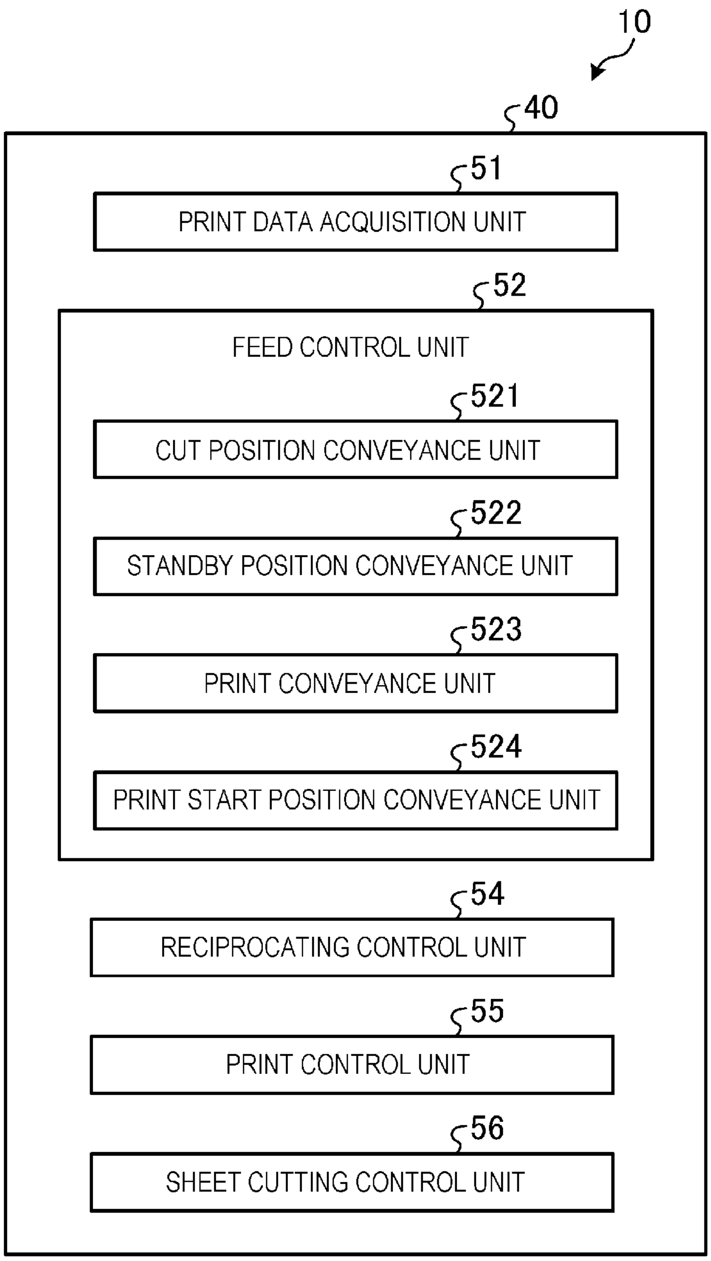
FIG. 4 is a functional block diagram illustrating an example of a functional configuration.

A functional configuration of the label printer 10 will be described with reference to FIG. 4. FIG. 4 is a functional block diagram illustrating an example of the functional configuration of the label printer according to the embodiment.

By executing the control program P, the control unit 40 of the label printer 10 implements a print data acquisition unit 51, a feed control unit 52, a reciprocating control unit 54, a print control unit 55, and a sheet cutting control unit 56 that are illustrated in FIG. 4.

The print data acquisition unit 51 acquires print data to be printed on the label sheet 30. Specifically, the print data acquisition unit 51 acquires print data corresponding to the commodity code or the like read by the scanner 47. The print data acquisition unit 51 may acquire the print data from the server apparatus (not illustrated) via the communication interface 48.

The feed control unit 52 conveys (feeds) the label sheet 30 by controlling a rotation direction of the platen roller drive motor 15. The feed control unit 52 further includes a cut position conveyance unit 521, a standby position conveyance unit 522, a print conveyance unit 523, and a print start position conveyance unit 524.

The cut position conveyance unit 521 conveys, to a position of the cutter 18, the label sheet 30 on which the printing is completed.

If there is no print start instruction for a predetermined period of time, the standby position conveyance unit 522 conveys the label sheet 30 to a standby position. The standby position conveyance unit 522 is an example of a standby position moving unit according to the disclosure.

The print conveyance unit 523 conveys the label sheet 30 when the printing is executed on the label sheet 30.

The print start position conveyance unit 524 conveys the label sheet 30 on which the printing is completed to a print start position after the label sheet 30 is cut by the cutter 18. After the reciprocating control unit 54, which will be described later, causes the label sheet 30 to reciprocate, the print start position conveyance unit 524 conveys the label sheet 30 to the print start position. The print start position conveyance unit 524 may convey the label sheet 30 to the print start position by rotating the platen roller 13 counter-clockwise, or may convey the label sheet 30 to the print start position by rotating the platen roller 13 clockwise. The print start position conveyance unit 524 is an example of a print start position moving unit according to the disclosure.

When the print start instruction is received, the reciprocating control unit 54 causes a holding position of the label sheet 30 sandwiched between the thermal head 16 and the platen roller 13 to reciprocate between a first position and a second position by controlling the rotation direction of the platen roller drive motor 15. Specifically, the reciprocating control unit 54 moves the holding position of the label sheet 30 to the first position downstream (Y-axis positive side) in a conveyance direction of the label sheet 30, and then moves the holding position moved to the first position to the second position upstream (Y-axis negative side) of the first position in the conveyance direction. The reciprocating control unit 54 repeats reciprocation a predetermined number of times. The reciprocating control unit 54 is an example of a reciprocating unit according to the disclosure.

The print control unit 55 prints the print data on the label sheet 30 by controlling an operation of the thermal head 16.

After the cut position conveyance unit 521 conveys, to the position of the cutter 18, a cutting position of the label sheet 30 on which the printing is completed, the sheet cutting control unit 56 drives the cutter 18 to cut the label sheet 30.

Operations of Label Printer

Figure 5:
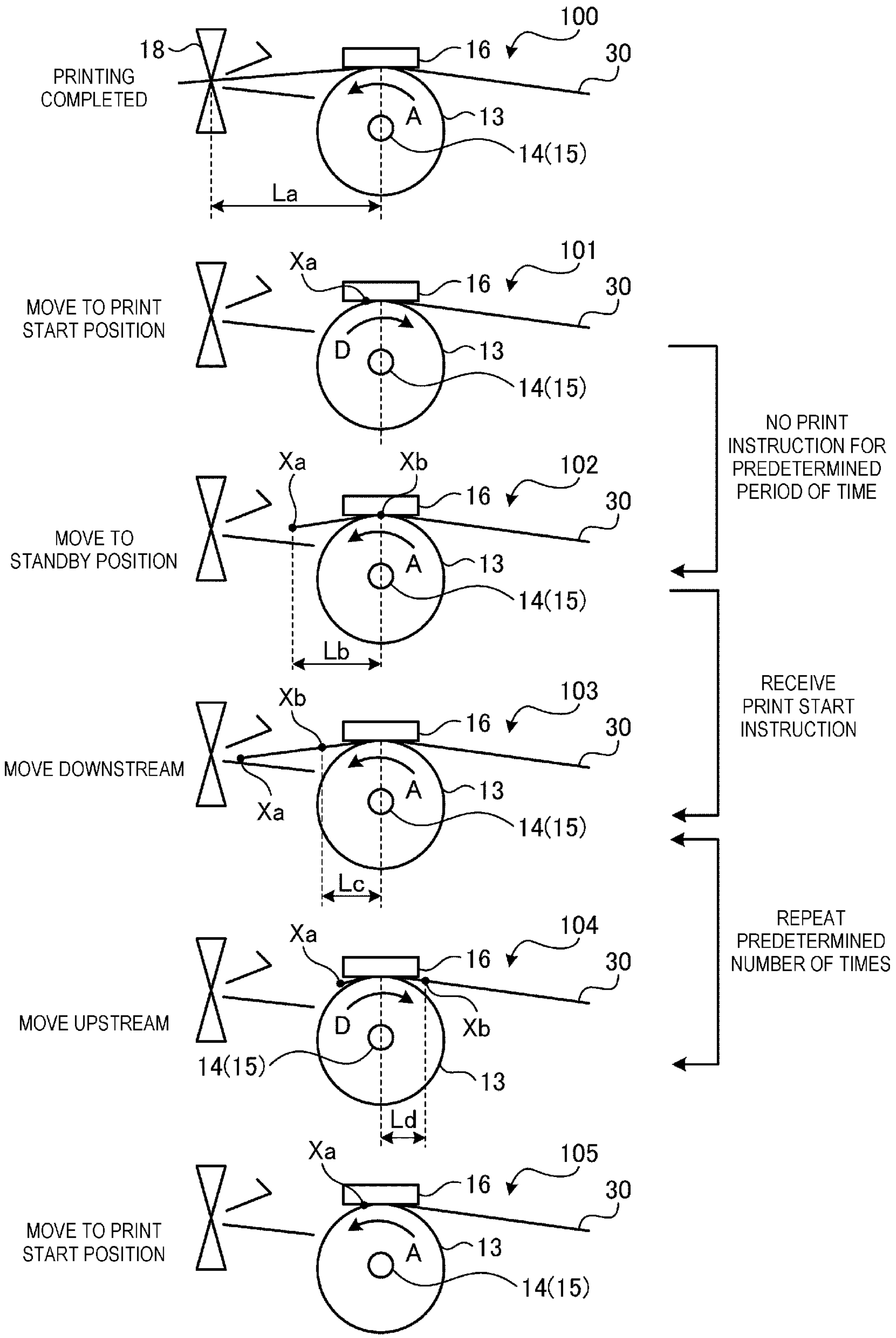
FIG. 5 is a diagram illustrating an example of a flow of print operations.

A flow of print operations of the label printer 10 will be described with reference to FIG. 5. FIG. 5 is a diagram illustrating an example of a flow of print operations according to the embodiment. FIG. 5 illustrates a state 100 to a state 105 of the label printer 10 according to the passage of time.

Description of State 100

The state 100 represents a state in which, after the printing on the label sheet 30 is completed, the cut position conveyance unit 521 conveys the label sheet 30 to the cutting position of the cutter 18 by rotating the platen roller 13 in the direction of the arrow A. In this state, the label sheet 30 is cut by the cutter 18. A horizontal distance from the shaft center 14 of the platen roller 13 to the cutter 18 is La. Therefore, the cut position conveyance unit 521 conveys the label sheet 30 on which the printing is completed downstream by at least the distance La.

Description of State 101

The state 101 indicates a state in which the print start position conveyance unit 524 back feeds the label sheet 30 cut by the cutter 18 and conveys the label sheet 30 to the print start position by rotating the platen roller 13 in a direction of an arrow D. At this time, the print start position of the label sheet 30 is moved to the holding position between the platen roller 13 and the thermal head 16. Further, a leading end Xa of the label sheet is located downstream of the holding position between the platen roller 13 and the thermal head 16.

Description of State 102

If there is no print start instruction for a predetermined period of time in the state 101, the standby position conveyance unit 522 moves the label sheet 30 to the standby position by rotating the platen roller 13 in the direction of the arrow A. At this time, a horizontal distance from the shaft center 14 of the platen roller 13 to the leading end Xa of the label sheet 30 is Lb. The distance Lb is set such that the leading end Xa of the label sheet 30 that moves to the standby position reaches the paper guide 20 at least beyond the gap 21 (see FIG. 2). This is because if a feeding amount, from the holding position, of the leading end Xa of the label sheet 30 is small at the standby position, when the platen roller 13 is rotated in the direction of the arrow A, the label sheet 30 attached to the platen roller 13 may be rotated along with the platen roller 13, and the leading end Xa of the label sheet 30 may pass through the gap 21 and may go out of a region guided by the paper guide 20.

Description of State 103

If the print start instruction is received in the state 102, the reciprocating control unit 54 moves, from the shaft center 14 of the platen roller 13, a holding position Xb of the label sheet 30 by a distance Lc in a horizontal direction by rotating the platen roller 13 in the direction of the arrow A. At this time, a position to which the holding position Xb of the label sheet 30 is moved is a first position according to the disclosure.

Description of State 104

Next, the reciprocating control unit 54 moves the first position (the holding position Xb) of the label sheet 30 in the state 103 by a distance (Lc+Ld) in the horizontal direction by rotating the platen roller 13 in the direction of the arrow D. Accordingly, the first position of the label sheet 30 in the state 103 is moved upstream beyond the holding position between the platen roller 13 and the thermal head 16. At this time, a position to which the first position of the label sheet 30 is moved is a second position according to the disclosure. Then, the label printer 10 alternately repeats the state 103 and the state 104 a predetermined number of times. The predetermined number of times is, for example, two times, but may be set as appropriate. When the label sheet 30 is moved to the second position, the above distance Lb and a distance Ld are set to satisfy Lb>Ld so that the leading end Xa of the label sheet 30 does not go out upstream beyond a contact position between the platen roller 13 and the thermal head 16.

That is, a movement amount (horizontal distance) of the label sheet 30 by the reciprocating control unit 54 is Lc downstream, a distance (Lc+Ld) upstream, the distance (Lc+Ld) downstream, and the distance (Lc+Ld) upstream . . . in the order of time course. A specific movement amount may be set as appropriate, and for example, the movement amount is preferably set such that the leading end of the label sheet 30 does not enter the gap 21 described above and the gap between the platen roller 13 and the platen guide 22 when the label sheet 30 is reciprocated. For example, the movement amount is set to approximately ¼ of a diameter of the platen roller 13.

Description of State 105

By alternately repeating the state 103 and the state 104 a predetermined number of times, the label sheet 30 attached to the platen roller 13 is pulled apart from the platen roller 13. Then, the print start position conveyance unit 524 conveys the label sheet 30 to the print start position by rotating the platen roller 13 in the direction of the arrow A.

Flow of Processes Executed by Label Printer

Figure 6:
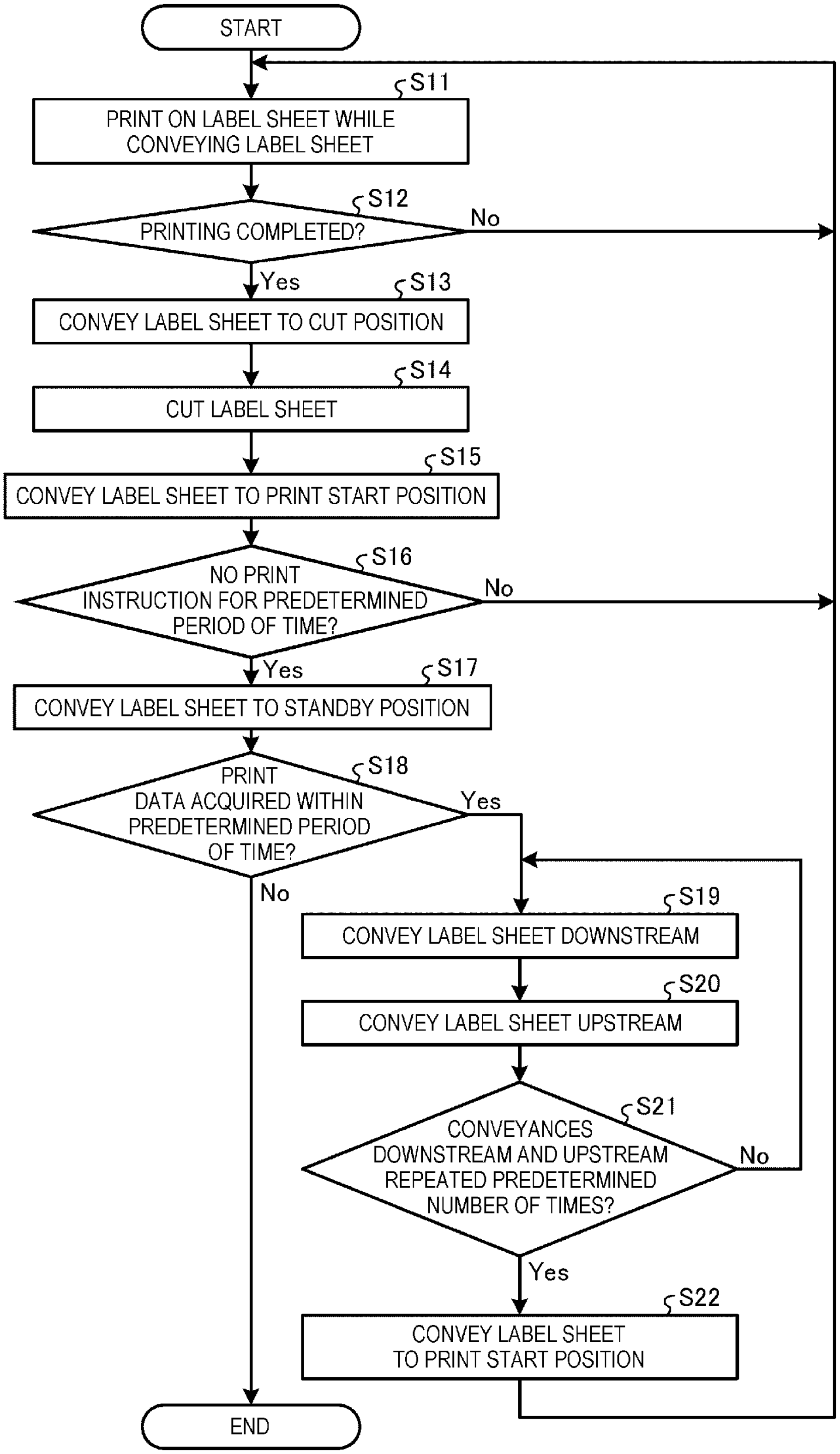
FIG. 6 is a flowchart illustrating an example of a flow of a print process.

A flow of processes executed by the label printer 10 will be described with reference to FIG. 6. FIG. 6 is a flowchart illustrating an example of a flow of a print process executed by the label printer according to the embodiment.

The print control unit 55 prints the print data on the label sheet 30 to be conveyed by the print conveyance unit 523 (ACT 11).

It is determined whether the print control unit 55 completes the printing (ACT 12). If it is determined that the printing is completed (ACT 12: Yes), the process proceeds to ACT 13. On the other hand, if it is determined that the printing is not completed (ACT 12: No), the process returns to ACT 11 and the printing is continued.

If it is determined in ACT 12 that the printing is completed, the cut position conveyance unit 521 conveys, to the position of the cutter 18, the label sheet 30 on which the printing is completed (ACT 13).

The sheet cutting control unit 56 causes the cutter 18 to cut the label sheet 30 (ACT 14).

The print start position conveyance unit 524 conveys the label sheet 30 to the print start position (ACT 15).

The standby position conveyance unit 522 determines whether there is no print start instruction for a predetermined period of time (ACT 16). If the standby position conveyance unit 522 determines that there is no print start instruction for the predetermined period of time (ACT 16: Yes), the process proceeds to ACT 17. On the other hand, if the standby position conveyance unit 522 determines that there is a print start instruction for the predetermined period of time (ACT 16: No), that is, if a next print start instruction is received before the predetermined period of time elapses, the process returns to ACT 11.

If the standby position conveyance unit 522 determines in ACT 16 that there is no print start instruction for the predetermined period of time, the standby position conveyance unit 522 conveys the label sheet 30 to the standby position (ACT 17).

It is determined whether the print data acquisition unit 51 acquires the print data within a predetermined period of time (ACT 18). If it is determined that the print data is acquired within the predetermined period of time (ACT 18: Yes), the process proceeds to ACT 19. On the other hand, if it is determined that the print data is not acquired within the predetermined period of time (ACT 18: No), the label printer 10 ends the process in FIG. 6. The predetermined period of time in ACT 16 and the predetermined period of time in ACT 18 does not need to be the same, and are set independently.

If it is determined in ACT 18 that the print data is acquired, the reciprocating control unit 54 moves the holding position of the label sheet 30 between the thermal head 16 and the platen roller 13 to the first position downstream (Y-axis positive side) in the conveyance direction of the label sheet 30 (ACT 19).

Then, the reciprocating control unit 54 moves the holding position moved to the first position to the second position upstream (Y-axis negative side) in the conveyance direction (ACT 20).

It is determined whether the reciprocating control unit 54 repeats movements of the label sheet 30 downstream and upstream a predetermined number of times (ACT 21). If it is determined that the movements downstream and upstream are repeated the predetermined number of times (ACT 21: Yes), the process proceeds to ACT 22. On the other hand, if it is determined that the movements downstream and upstream are not repeated the predetermined number of times (ACT 21: No), the process returns to ACT 19.

If it is determined in ACT 21 that the movements downstream and upstream are repeated the predetermined number of times, the print start position conveyance unit 524 conveys the label sheet 30 to the print start position (ACT 22). Thereafter, the process returns to ACT 11, and the printing is executed.

As described above, the label printer 10 (printer apparatus) according to the embodiment includes: a thermal head 16 (print unit) configured to execute the printing on the label sheet 30 (print sheet) that includes a front surface 301 as the print surface and a back surface 302 as the adhesive layer and that does not include a liner; a platen roller 13 (conveyance unit) that is provided at a position facing the thermal head 16, that pulls out, by being rotationally driven, one end of the roll sheet 31 obtained by winding the label sheet 30 in the roll shape, and that conveys the roll sheet 31 to the thermal head 16; and a reciprocating control unit 54 (reciprocating unit) configured to, when the print start instruction is received, cause the holding position of the label sheet 30 sandwiched between the thermal head 16 and the platen roller 13 to reciprocate between the first position downstream in the conveyance direction of the label sheet 30 and the second position upstream of the first position in the conveyance direction. Therefore, the label printer 10 has a simple configuration and is capable of pulling apart the label sheet 30 attached to the platen roller 13 from the platen roller 13.

In the label printer 10 (printer apparatus) according to the embodiment, the first position is downstream of the holding position in the conveyance direction of the label sheet 30, and the second position is upstream of the holding position in the conveyance direction of the label sheet 30. Therefore, the label sheet 30 attached to the platen roller 13 is capable of being reliably pulled apart from the platen roller 13.

The label printer 10 (printer apparatus) according to the embodiment further includes a print start position conveyance unit 524 (print start position moving unit) configured to move, to the print start position, the label sheet 30 moved by the reciprocating control unit 54 (reciprocating unit). Therefore, after the label sheet 30 attached to the platen roller 13 is pulled apart from the platen roller 13, the label sheet 30 is capable of being automatically moved to the print position.

The label printer 10 (printer apparatus) according to the embodiment further includes a standby position conveyance unit 522 (standby position moving unit) configured to, after the printing is completed, convey the leading end of the label sheet 30 to the standby position downstream in the conveyance direction of the label sheet 30. Therefore, in order to pull apart the label sheet 30 attached to the platen roller 13, when the label sheet 30 is reciprocated, the moved label sheet 30 enters the gap 21 between the platen roller 13 and the paper guide 20, so that jam of the label sheet 30 is capable of being prevented.

Modification of Embodiment

Next, a modification of the above label printer 10 will be described. In the modification of the label printer 10, if the print data is acquired when the label sheet 30 is at the standby position, the reciprocating control unit 54 executes reciprocating operations, different from the embodiment, for the label sheet 30.

Specifically, the reciprocating control unit 54 moves the label sheet 30 to the print start position after moving the holding position of the label sheet 30 sandwiched between the thermal head 16 and the platen roller 13 to the first position downstream in the conveyance direction of the label sheet 30.

Figure 7:
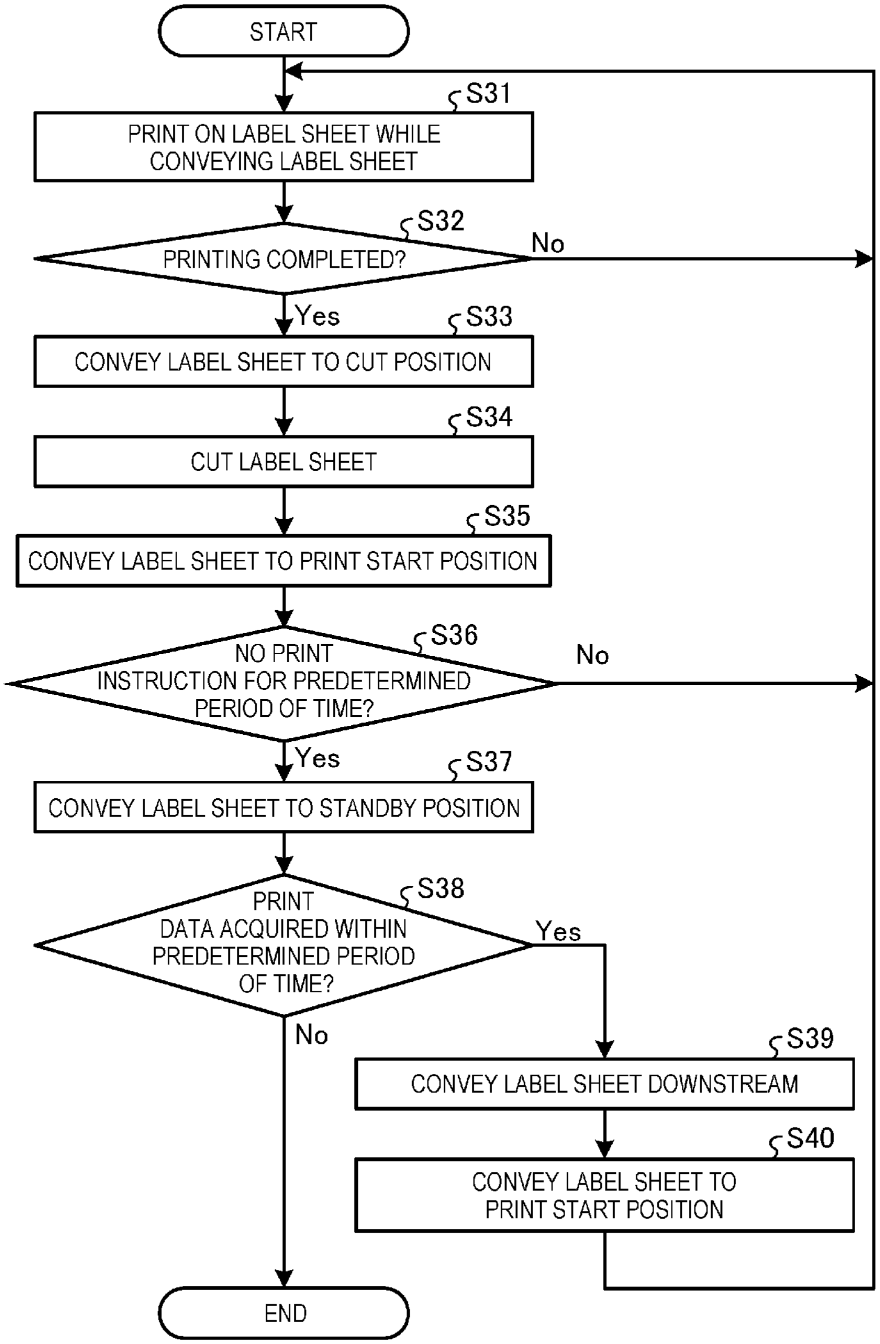
FIG. 7 is a flowchart illustrating an example of a flow of a print process of a label printer according to a modification of the embodiment.

A flow of processes executed by the label printer 10 according to the modification of the embodiment will be described with reference to FIG. 7. FIG. 7 is a flowchart illustrating an example of a flow of a print process of a label printer according to the modification of the embodiment.

The print control unit 55 prints the print data on the label sheet 30 conveyed by the print conveyance unit 523 (ACT 31).

It is determined whether the print control unit 55 completes the printing (ACT 32). If it is determined that the printing is completed (ACT 32: Yes), the process proceeds to ACT 33. On the other hand, if it is determined that the printing is not completed (ACT 32: No), the process returns to ACT 31 and the printing is continued.

If it is determined in ACT 32 that the printing is completed, the cut position conveyance unit 521 conveys, to the position of the cutter 18, the label sheet 30 on which the printing is completed (ACT 33).

The sheet cutting control unit 56 causes the cutter 18 to cut the label sheet 30 (ACT 34).

The print start position conveyance unit 524 conveys the label sheet 30 to the print start position (ACT 35).

The standby position conveyance unit 522 determines whether there is no print start instruction for a predetermined period of time (ACT 36). If the standby position conveyance unit 522 determines that there is no print start instruction for the predetermined period of time (ACT 36: Yes), the process proceeds to ACT 37. On the other hand, if the standby position conveyance unit 522 determines that there is a print start instruction for the predetermined period of time (ACT 36: No), that is, if a next print start instruction is received before the predetermined period of time elapses, the process returns to ACT 31.

If the standby position conveyance unit 522 determines in ACT 36 that there is no print start instruction for the predetermined period of time, the standby position conveyance unit 522 conveys the label sheet 30 to the standby position (ACT 37).

It is determined whether the print data acquisition unit 51 acquires the print data within a predetermined period of time (ACT 38). If it is determined that the print data is acquired within the predetermined period of time (ACT 38: Yes), the process proceeds to ACT 39. On the other hand, if it is determined that the print data is not acquired within the predetermined period of time (ACT 38: No), the label printer 10 ends the process in FIG. 7. The predetermined period of time in ACT 36 and the predetermined period of time in ACT 38 does not need to be the same, and are set independently.

If it is determined in ACT 38 that the print data is acquired, the reciprocating control unit 54 moves the holding position of the label sheet 30 between the thermal head 16 and the platen roller 13 to the first position downstream side (Y-axis positive side) in the conveyance direction of the label sheet 30 (ACT 39).

Then, the reciprocating control unit 54 moves the holding position moved to the first position to the print start position upstream (Y-axis negative side) in the conveyance direction (ACT 40). Thereafter, the process returns to ACT 31, and the printing is executed.

As described above, in the label printer 10 according to the modification of the embodiment, the first position is downstream of the holding position in the conveyance direction of the label sheet 30, and the second position is the print start position. Therefore, after the label sheet 30 attached to the platen roller 13 is pulled apart from the platen roller 13, the time for moving the label sheet 30 to the print start position is capable of being shortened.

While the embodiment of the disclosure has been described above, the embodiment has been presented by way of example only, and is not intended to limit the scope of the disclosure. A novel embodiment may be embodied in a variety of forms, and various omissions, substitutions, and changes are capable of being made without departing from the spirit of the disclosure. The embodiment and the modification thereof are included in the scope and gist of the disclosure, and are included in the scope of the disclosure disclosed in claims and equivalents of the disclosure.

What is claimed is:

1. A printer apparatus, comprising:

a print component configured to execute printing on a print sheet that includes a front surface as a print surface and a back surface as an adhesive layer and that does not include a liner over the adhesive layer;

a conveyance component provided at a position facing the print component, that pulls out, by being rotationally driven, one end of a roll sheet obtained by winding the print sheet in a roll shape, and that conveys the roll sheet to the print component; and a reciprocating component configured to, when a print start instruction is received, cause a holding position of the print sheet sandwiched between the print component and the conveyance component to reciprocate between a first position downstream in a conveyance direction of the print sheet and a second position upstream of the first position in the conveyance direction.

2. The printer apparatus according to claim 1, wherein the first position is downstream of the holding position in the conveyance direction of the print sheet, and the second position is upstream of the holding position in the conveyance direction of the print sheet.

3. The printer apparatus according to claim 1, further comprising:

a print start position moving component configured to move, to a print start position, the print sheet moved by the reciprocating component.

4. The printer apparatus according to claim 1, wherein the first position is downstream of the holding position in the conveyance direction of the print sheet, and the second position is a print start position.

5. The printer apparatus according to claim 1, further comprising:

a standby position moving component configured to, after the printing is completed, convey a leading end of the print sheet to a standby position downstream in the conveyance direction of the print sheet.

6. The printer apparatus according to claim 1, further comprising:

a cutter that cuts the print sheet discharged from a discharge port after printing is completed.

7. The printer apparatus according to claim 1, wherein the conveyance component comprises a platen roller.

8. A label printer, comprising:

a thermal print component configured to execute printing on a print sheet that includes a front surface as a print surface and a back surface as an adhesive layer and that does not include a liner over the adhesive layer;

a conveyance component provided at a position facing the thermal print component, that pulls out, by being rotationally driven, one end of a roll sheet obtained by winding the print sheet in a roll shape, and that conveys the roll sheet to the thermal print component; and a reciprocating component configured to, when a print start instruction is received, cause a holding position of the print sheet sandwiched between the thermal print component and the conveyance component to reciprocate between a first position downstream in a conveyance direction of the print sheet and a second position upstream of the first position in the conveyance direction.

9. The label printer according to claim 8, wherein
the first position is downstream of the holding position in the conveyance direction of the print sheet, and
the second position is upstream of the holding position in the conveyance direction of the print sheet.

10. The label printer according to claim 8, further comprising:
a print start position moving component configured to move, to a print start position, the print sheet moved by the reciprocating component.

11. The label printer according to claim 8, wherein
the first position is downstream of the holding position in the conveyance direction of the print sheet, and
the second position is a print start position.

12. The label printer according to claim 8, further comprising:
a standby position moving component configured to, after the printing is completed, convey a leading end of the print sheet to a standby position downstream in the conveyance direction of the print sheet.

13. The label printer according to claim 8, further comprising:
a cutter that cuts the print sheet discharged from a discharge port after printing is completed.

14. The label printer according to claim 8, wherein
the conveyance component comprises a platen roller.

15. A method of printing a print sheet that includes a front surface as a print surface and a back surface as an adhesive layer and that does not include a liner over the adhesive layer, while minimizing jamming, comprising:
printing on the print sheet;
pulling out, by rotationally driving a conveyance component provided at a position facing a print component, one end of a roll sheet obtained by winding the print sheet in a roll shape, and conveying the roll sheet to the print component; and
when a print start instruction is received, causing a holding position of the print sheet sandwiched between the print component and a conveyance component to reciprocate between a first position downstream in a conveyance direction of the print sheet and a second position upstream of the first position in the conveyance direction.

16. The method according to claim 15, wherein
the first position is downstream of the holding position in the conveyance direction of the print sheet, and
the second position is upstream of the holding position in the conveyance direction of the print sheet.

17. The method according to claim 15, further comprising:
moving, to a print start position, the print sheet moved by the reciprocating component.

18. The method according to claim 15, wherein
the first position is downstream of the holding position in the conveyance direction of the print sheet, and
the second position is a print start position.

19. The method according to claim 15, further comprising:
after the printing is completed, conveying a leading end of the print sheet to a standby position downstream in the conveyance direction of the print sheet.

20. The method according to claim 15, further comprising:
cutting the print sheet discharged from a discharge port after printing is completed.

* * * * *